UNITED STATES PATENT OFFICE.

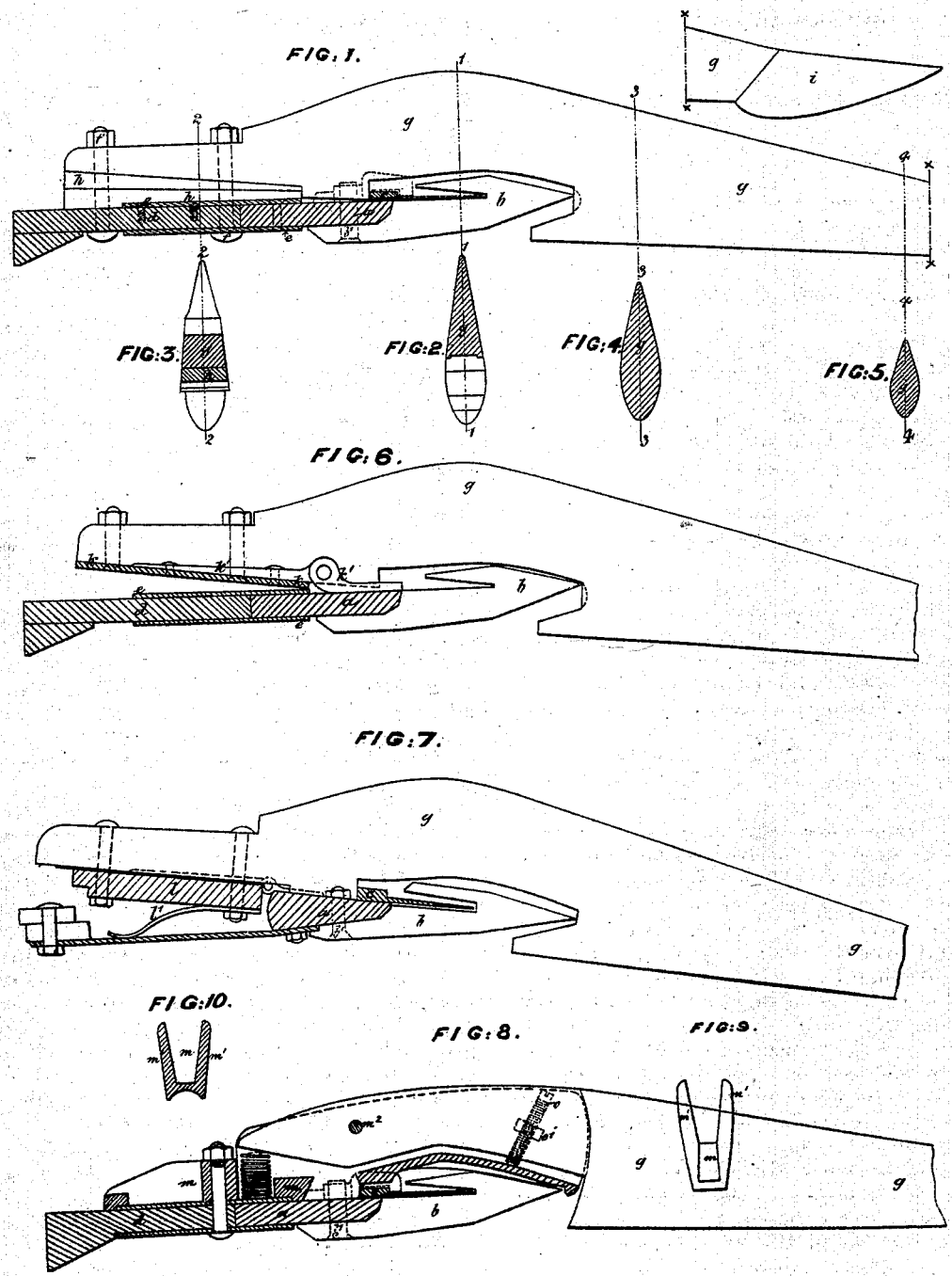

ALFRED HUGHES, OF BRAMPTON ASH, ENGLAND.

IMPROVEMENT IN LIFTING-FINGERS FOR HARVESTERS.

Specification forming part of Letters Patent No. 144,457, dated November 11, 1873; application filed July 14, 1873.

*To all whom it may concern:*

Be it known that I, ALFRED HUGHES, of Brampton Ash, in the county of Northampton, England, a subject of the Queen of Great Britain, have invented or discovered new and useful Improvements in Apparatus to be Applied to Reaping and Mowing Machines; and I, the said ALFRED HUGHES, do hereby declare the nature of the said invention, and in what manner the same is to be performed, to be particularly described and ascertained in and by the following statement thereof—that is to say:

This invention has for its object improvements in apparatus to be applied to reaping and mowing machines.

In order to enable reaping and mowing machines the better to cut laid crops, it has often and long since been proposed to employ lifters or prongs projecting in front of the cutting apparatus and beyond the fingers. The points of these lifters were intended to pass under the laid crop and to raise it off the ground, so that the cutting apparatus might sever each straw in one place only, and that near to the root.

Now, I have ascertained that the conditions on which success depends are, that the lifter or lifting-finger should be strong without being heavy or rigid, or liable to bend, and that it should lift the crop highest when it is immediately over the cutting apparatus, and yet not higher than is requisite to allow the lifting-fingers to be of sufficient strength; also, that the lifting-finger shall be connected at its heel with the rocking platform, or with the finger-beam, by means which permit it (the lifting-finger) to be adjusted so that its points may be raised or depressed or may rise or lower automatically, to adapt it to the height from the ground at which the crop is cut, or to variations in the surface of the ground; that the said means of adjustment shall be interposed between the heel of the lifting-finger and the upper side of the platform or finger-beam, so that no portion of the lifting-finger is beneath the said finger-beam to engage with stubble, or be injured by stones or other projections from the ground; also, that the lifting-finger shall be recessed, so as to overlap and protect the points of the ordinary guard-fingers of the machine to which it may be temporarily applied.

The lifting-fingers of which the use has heretofore been attempted have not fulfilled these conditions.

According to my invention, I make separate lifting-fingers of wood. I mount them independently of each other upon the cutter-bar or the platform of the machine, placing one immediately over, say, every third, fourth, or fifth finger. The lifting-fingers are not attached to the finger, but they are notched out or recessed at their butts, so that the regular guard-fingers of the machine are overlapped and housed beneath them. The points of the lifting-fingers are a foot, or somewhat more, in front of the guard-finger points, and are so formed as not to dig into the ground when, in consequence of irregularities of the surface, the lifting-fingers come in contact with it. The greatest rise of the lifting-fingers is immediately over the cutting apparatus, and the rise is no more than is necessary to give the depth over the guard-fingers which is requisite for strength.

The lifting-fingers may be attached by bolts to the platform behind the cutting apparatus; and in case the means provided for adjusting the height of the points of the lifting-fingers are bolted upon the platform, they will have considerable freedom to yield to and avoid obstacles, the platform itself being very flexible. Nevertheless, I prefer, in order to give each independent lifting-finger greater freedom, and to enable the adjustment to be automatic, to fix them either to a spring-board, or to a flexible plate jointed to the cutter-bar or platform; or I cause the heel of each lifting-finger to be received into and jointed to a shoe fixed to the platform, and I provide a spring to keep the lifting-finger down, except when it is caused to rise by meeting with an obstacle on the land. Sometimes I provide an adjustable screw-stop.

In order that my invention may be most fully understood, and readily carried into effect, I will proceed to describe the drawings hereunto annexed.

Figure 1 is a longitudinal section of a wooden lifting-finger fixed upon the platform of a reaping-machine. *a* is the finger-bar of the machine; $b$, one of the ordinary guard-fingers fixed upon it by the bolt $b'$. $c$ is the knife. $d$ is the fore part of the wooden platform, which is connected with the finger-bar by the metal straps $e\ e$. The bolts $f\ f$ secure my wooden lifting-finger $g$ to the platform. $h\ h$ are wedges under the heel of the lifting-fingers, by varying the angle of which the position of the point of the lifting-finger may be adjusted. $i$ is a cast-iron tip, with which the point of the lifting-finger may be armed to render it more durable. The butt of the lifting-finger is notched or recessed, so that the guard-finger is overlapped or housed under the lifting-finger, and that material cannot engage upon the guard-finger and clog the machine.

In place of the ordinary guard-finger $b$, a truncated or pointless guard-finger may be employed at each of the places where a lifting-finger is applied.

Fig. 2 is a section of the lifting-finger over the cutting apparatus on the line 1 1 in Fig. 1, at which point it rises highest. In front of this line it slopes easily down to the point, and in rear of the line it falls somewhat suddenly; but, nevertheless, it sustains the cut crop until it has passed clear over the cutting apparatus, and landed it on the platform in rear thereof.

Figs. 3, 4, and 5 are other sections of the lifting-finger, taken on the lines 2 2, 3 3, and 4 4 in Fig. 1, respectively.

If the land on which the machine is required to work is comparatively level, the lifting-fingers may very conveniently be bolted to the platform, as already described, and be adjusted to the height of the cutters by the wedges; but in other cases I fix them upon a flexible iron or steel plate, as is shown in Fig. 6, which is a longitudinal section. $k$ is the plate. It is connected with the platform by hinges $k'\ k'$, of which there may be three or four in the length of the plate. In this arrangement the weight of the set of lifting-fingers keeps them down, resting upon the tops of the guard-fingers until either of them meets with an obstacle, and then, in consequence of the flexibility of the plate, this lifting-finger is able to yield and to rise to a considerable extent, so as to adjust itself independently of the other lifting-fingers.

Fig. 7 shows a similar arrangement, in which the lifting-fingers are self-adjusting, a board, $l$, with springs $l'$ beneath it, being substituted for the metal plate. In this case the front board of the platform is removed to make room for the hinged board, and a space is thus left through which short stuff can fall away off the platform and leave the platform clear, which is an advantage in the arrangement.

Still greater freedom and capacity for self-adjustment is given to the lifting-fingers by the arrangement shown at Fig. 8. $m$ is a metal shoe fixed upon the platform. It is formed with two side cheeks, $m^1\ m^1$, between which the heel of the lifting-fingers enters, and it is secured by a pin, $m^2$. An end view of this shoe is shown at Fig. 9, and a transverse section at Fig. 10. The spring $n$, placed under the heel of the lifting-finger, holds it down, except when it meets with an obstacle, and then the lifting-finger rises, and the spring, being overpowered, yields. $o$ is a screw, working through a nut, $o'$, let into the lifting-fingers. By it the distance the point of the lifting-finger is able to descend below the points of the guard-fingers is adjusted. This arrangement is that which I prefer where the land on which the machine is to be used is of a very uneven character.

In each of the arrangements described, it will be observed that the form of the lifting-fingers is substantially the same, and the conditions on which I have found that success depends are fulfilled; the lifting-finger being constructed of wood, and of such form as to lift the crop highest immediately over the cutting apparatus, and also being connected with the raking-platform, or with the finger-beam, by adjusting instrumentalities interposed between its heel and the upper side of said platform, (or finger-beam,) so that there is no appurtenance of the lifting-finger beneath the platform to be affected by obstructions; and the lifting-finger in each case being recessed, so that the ordinary guard-finger is housed beneath it, so that material cannot lodge upon its point. And in practice it will be found that, by the use of lifting-fingers such as I have described, not only is the laid corn raised into a position to be properly cut, but also that much of the loose stuff and weeds which usually pass through the cutting apparatus, and frequently clog it, are now carried clear over the top of the cutting apparatus, and are lodged upon the platform behind.

Having thus described the nature of my said invention, and the manner of performing the same, I would have it understood that I claim—

The combination and arrangement, substantially as before set forth, of the raking-platform, the lifting-finger, and the means of adjusting the lifting-finger to the platform, the said lifting-finger being constructed so as to raise the crop highest over the cutting apparatus, and the said means of adjustment being interposed (in the rear of the cutters) between the under side of the heel of the lifting-finger and the upper side of the said platform.

A. HUGHES.

Witnesses:
  REGD. E. HANSON,
  THOS. BROWN,
*Both of No. 17 Gracechurch street, London.*